(12) United States Patent
Vasseur et al.

(10) Patent No.: US 11,902,127 B2
(45) Date of Patent: Feb. 13, 2024

(54) AUTOMATIC DETECTION AND TRACKING OF ANOMALOUS RECTIFIABLE PATHS USING TIME-SERIES DYNAMICS

(71) Applicant: Cisco Technology, Inc., San Jose, CA (US)

(72) Inventors: Jean-Philippe Vasseur, Saint Martin d'Uriage (FR); Sambarta Dasgupta, Sunnyvale, CA (US); Vinay Kumar Kolar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/533,667

(22) Filed: Nov. 23, 2021

(65) Prior Publication Data

US 2023/0164045 A1 May 25, 2023

(51) Int. Cl.
*H04L 43/08* (2022.01)
*H04L 43/045* (2022.01)
*H04L 41/5019* (2022.01)

(52) U.S. Cl.
CPC .......... *H04L 43/08* (2013.01); *H04L 41/5019* (2013.01); *H04L 43/045* (2013.01)

(58) Field of Classification Search
CPC .... H04L 43/08; H04L 41/5019; H04L 43/045
See application file for complete search history.

(56) References Cited

U.S. PATENT DOCUMENTS

| 9,571,366 | B2 | 2/2017 | Duffield et al. |
| 9,652,354 | B2 | 5/2017 | Filimonov et al. |
| 9,729,571 | B1 | 8/2017 | Ferguson et al. |
| 11,411,845 | B1* | 8/2022 | Faisal Padinjareveetil ................. H04L 43/0888 |
| 2015/0082432 | A1* | 3/2015 | Eaton ...................... H04L 43/16 726/23 |
| 2016/0164721 | A1 | 6/2016 | Zhang et al. |
| 2016/0352765 | A1* | 12/2016 | Mermoud ........... H04L 63/1458 |
| 2019/0155672 | A1* | 5/2019 | Wang .................. G06F 11/0709 |
| 2020/0210393 | A1* | 7/2020 | Beaver .................... G06F 17/18 |
| 2020/0387797 | A1 | 12/2020 | Ryan et al. |

* cited by examiner

*Primary Examiner* — Viet D Vu
(74) *Attorney, Agent, or Firm* — BEHMKE INNOVATION GROUP LLC; James M. Behmke; James J. Wong

(57) ABSTRACT

In one embodiment, a device computes time series dynamics for a performance metric of a path in a network used to convey traffic for an online application. The device matches those time series dynamics to one or more dynamics categories. The device makes a determination as to whether the path in the network is anomalous, based on the one or more dynamics categories. The device provides, based on the determination, an indication that the path in the network is anomalous for display.

16 Claims, 17 Drawing Sheets

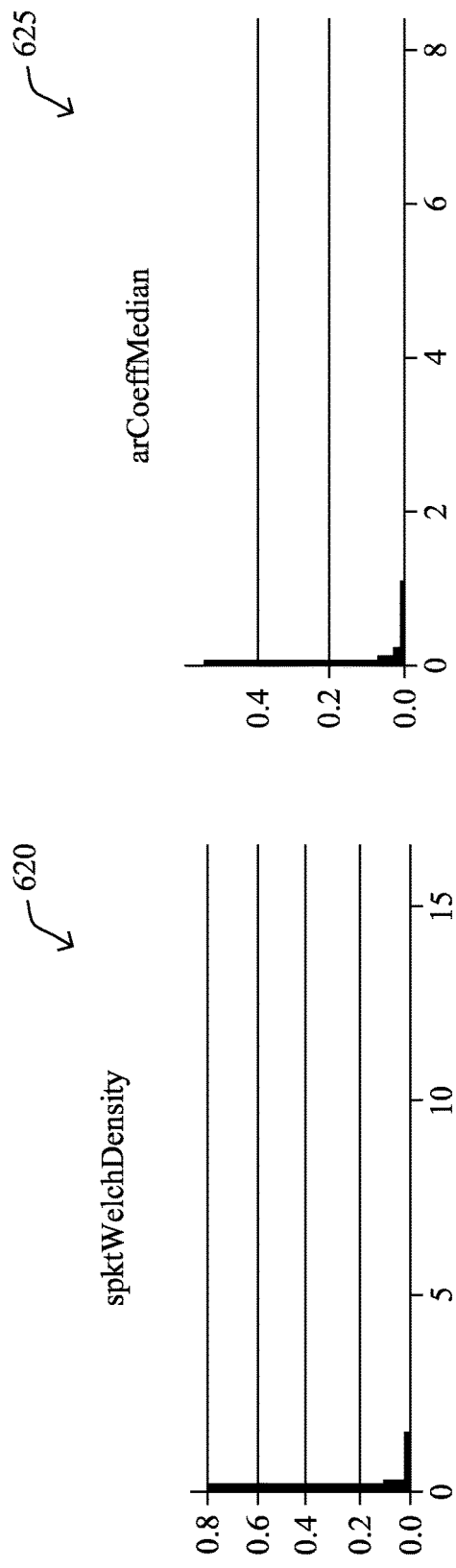
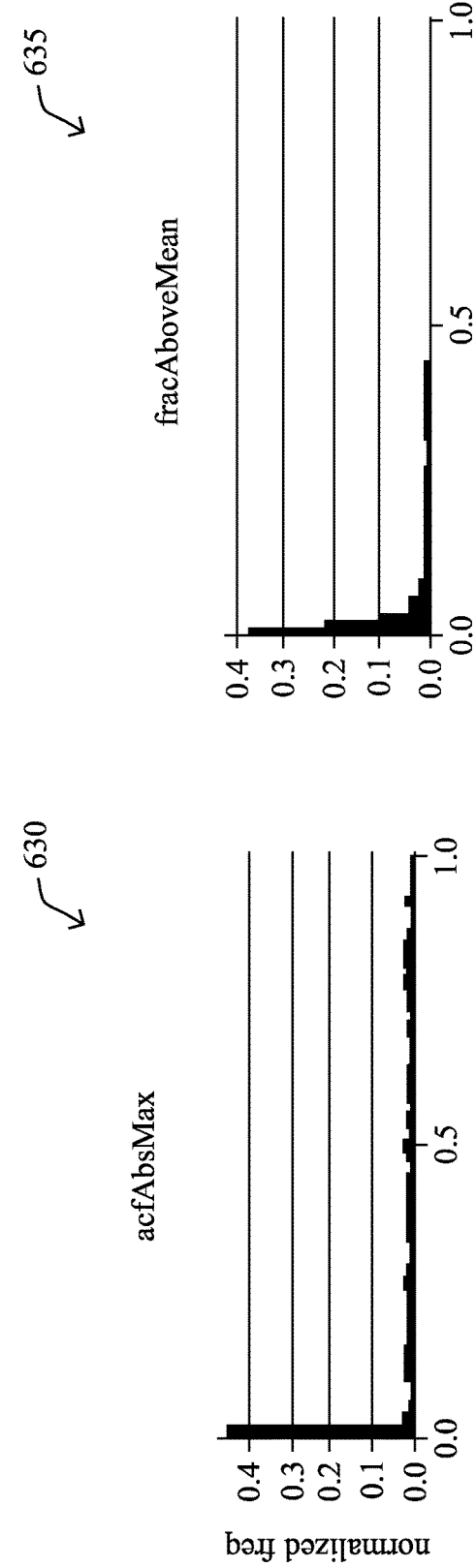
FIG. 6E
FIG. 6F
FIG. 6G
FIG. 6H

AUTOMATIC DETECTION AND TRACKING OF ANOMALOUS RECTIFIABLE PATHS USING TIME-SERIES DYNAMICS

TECHNICAL FIELD

The present disclosure relates generally to computer networks, and, more particularly, to the automatic detection and tracking of anomalous rectifiable paths using time-series dynamics.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

In large-scale enterprise SD-WANs and other networks, it is often extremely challenging for a network administrator to identify paths that do not provide satisfactory user experience for an online/software-as-a-service (SaaS) application, determine the cause of the problem, and rectify the situation by interacting with other network and/or service providers. Indeed, many enterprise networks now include tens of thousands of paths, such as multiple tunnels between branch routers and data centers, direct Internet paths from those routers to different SaaS applications, etc.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6L illustrate example plots of KPI dynamics;

DESCRIPTION OF EXAMPLE EMBODIMENTS

Overview

Figure 1A:
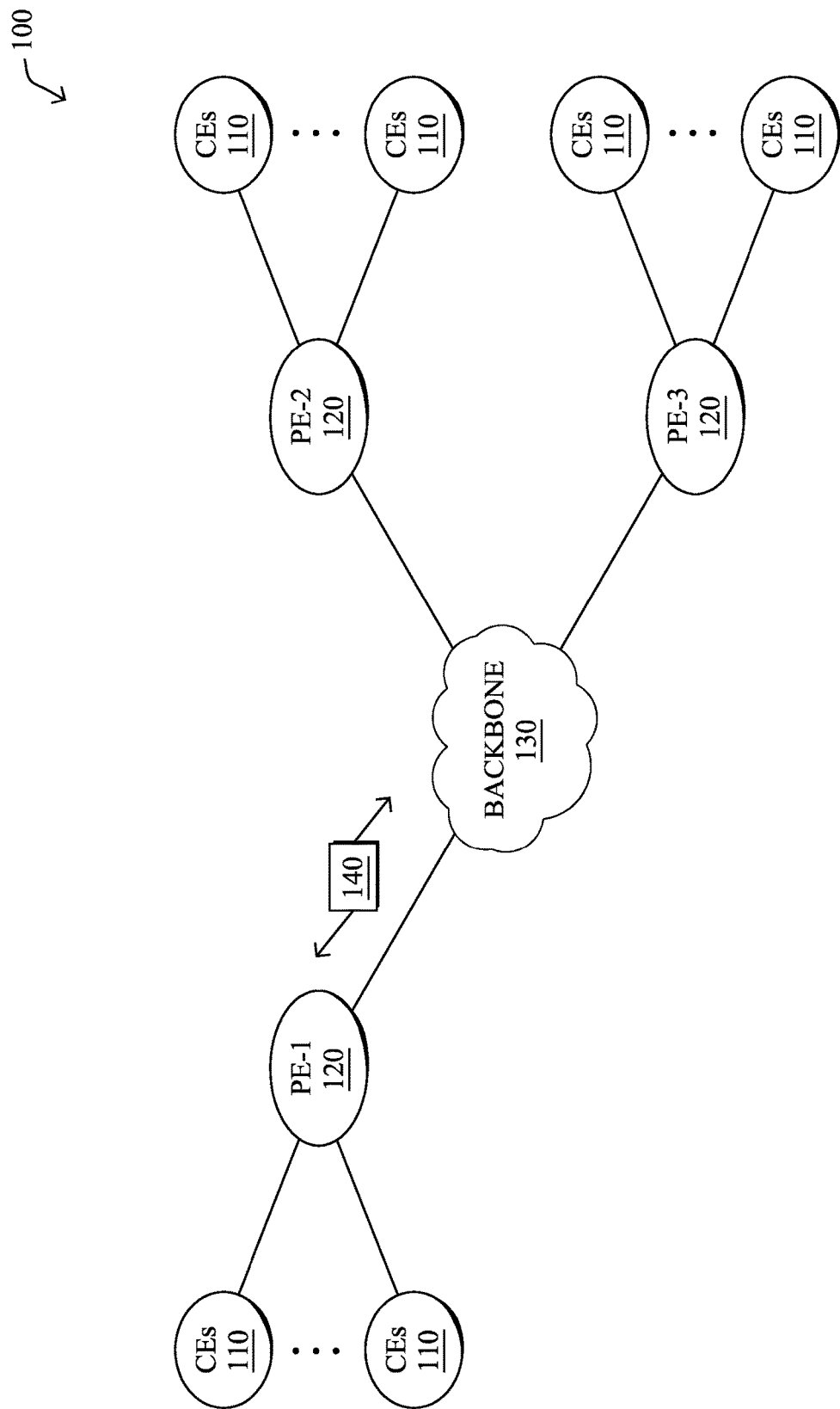
FIGS. 1A-1B illustrate an example communication network.

According to one or more embodiments of the disclosure, a device computes time series dynamics for a performance metric of a path in a network used to convey traffic for an online application. The device matches those time series dynamics to one or more dynamics categories. The device makes a determination as to whether the path in the network is anomalous, based on the one or more dynamics categories. The device provides, based on the determination, an indication that the path in the network is anomalous for display.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
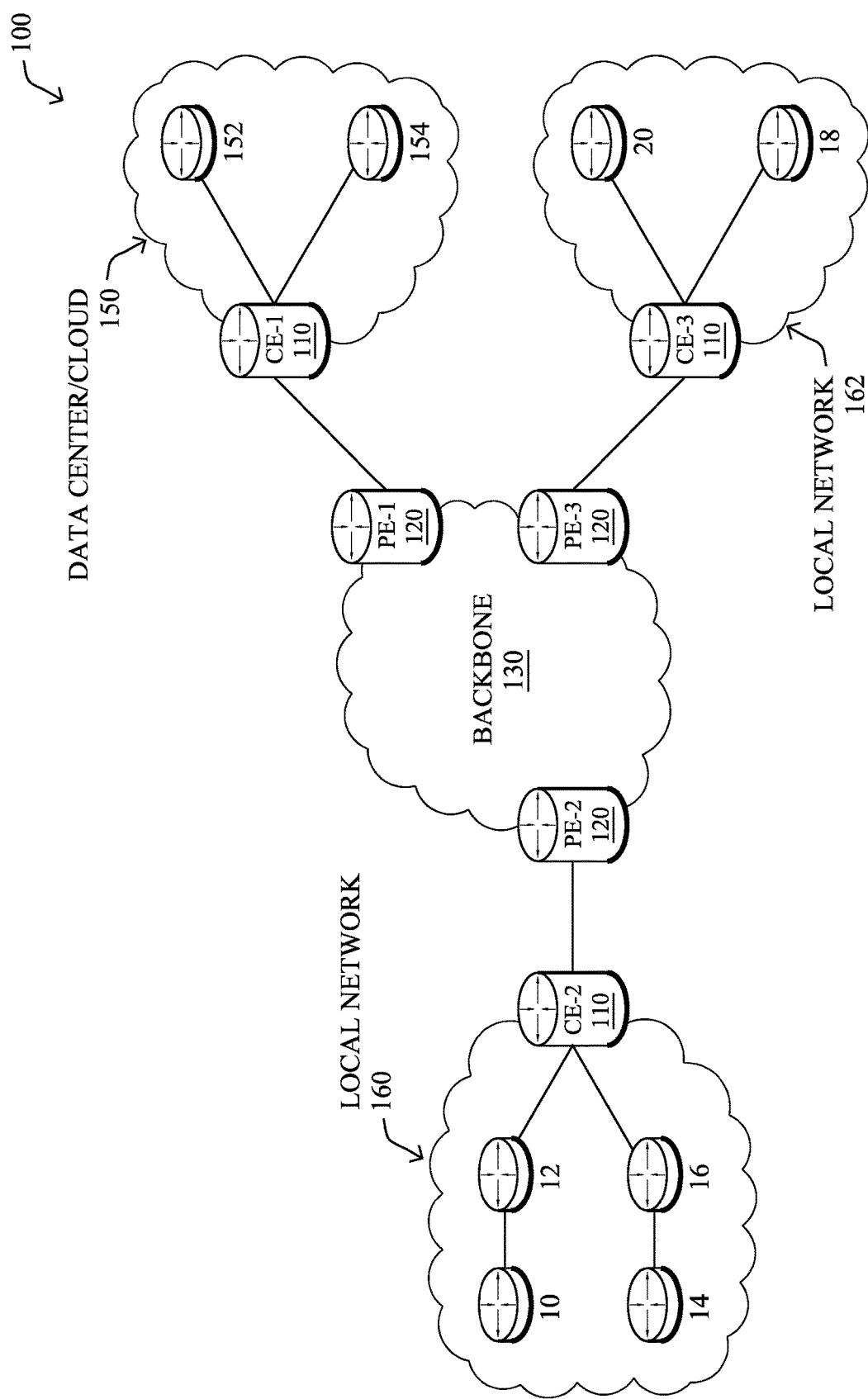

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
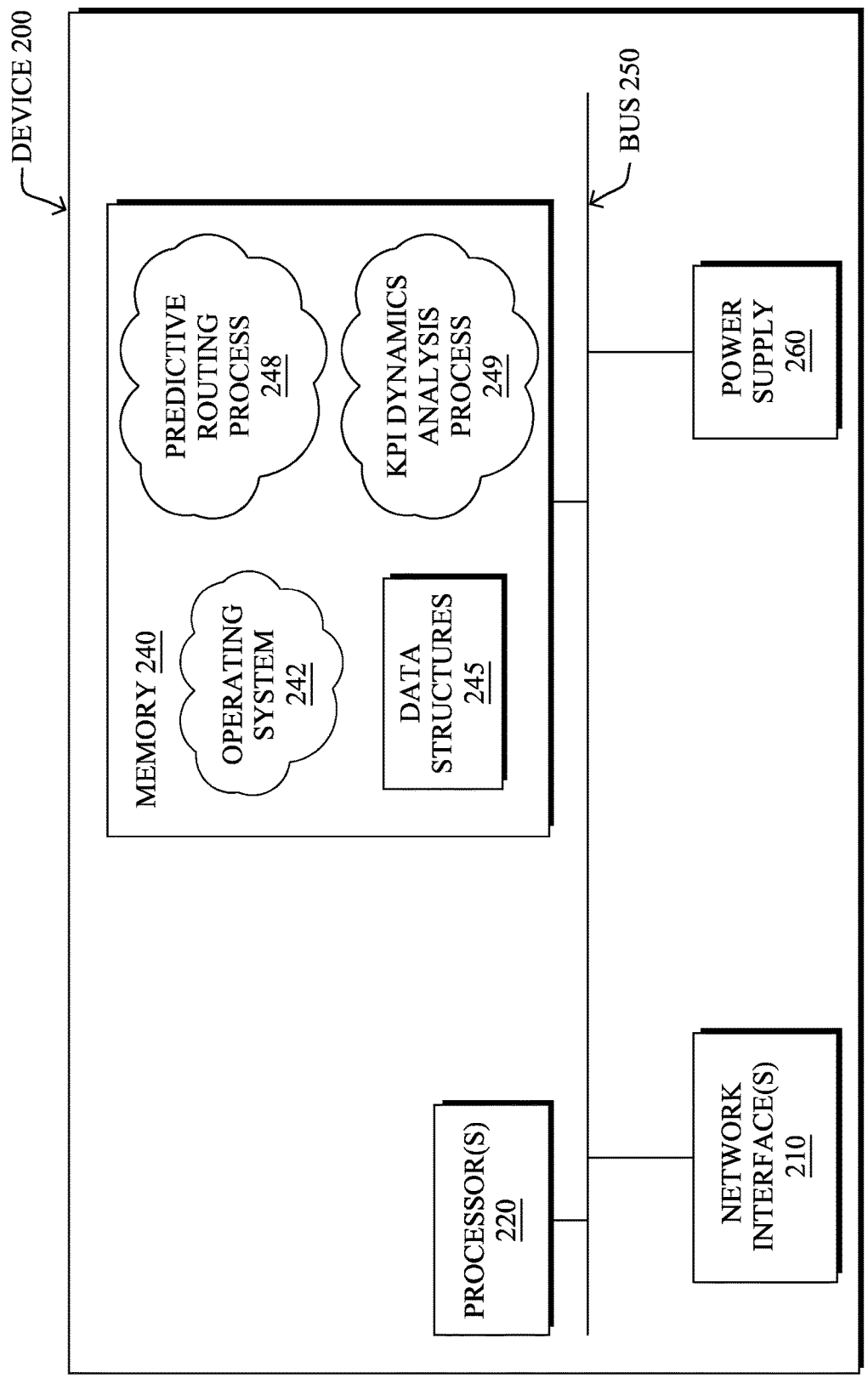
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a key performance indicator (KPI) dynamics analysis process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 and/or KPI dynamics analysis process 249 include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, predictive routing process 248 and/or KPI dynamics analysis process 249 may include computer executable instructions that, when executed by processor(s) 220, cause device 200 to perform the techniques described herein. To do so, in some embodiments, predictive routing process 248 and/or KPI dynamics analysis process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or KPI dynamics analysis process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or KPI dynamics analysis process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory KPI metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
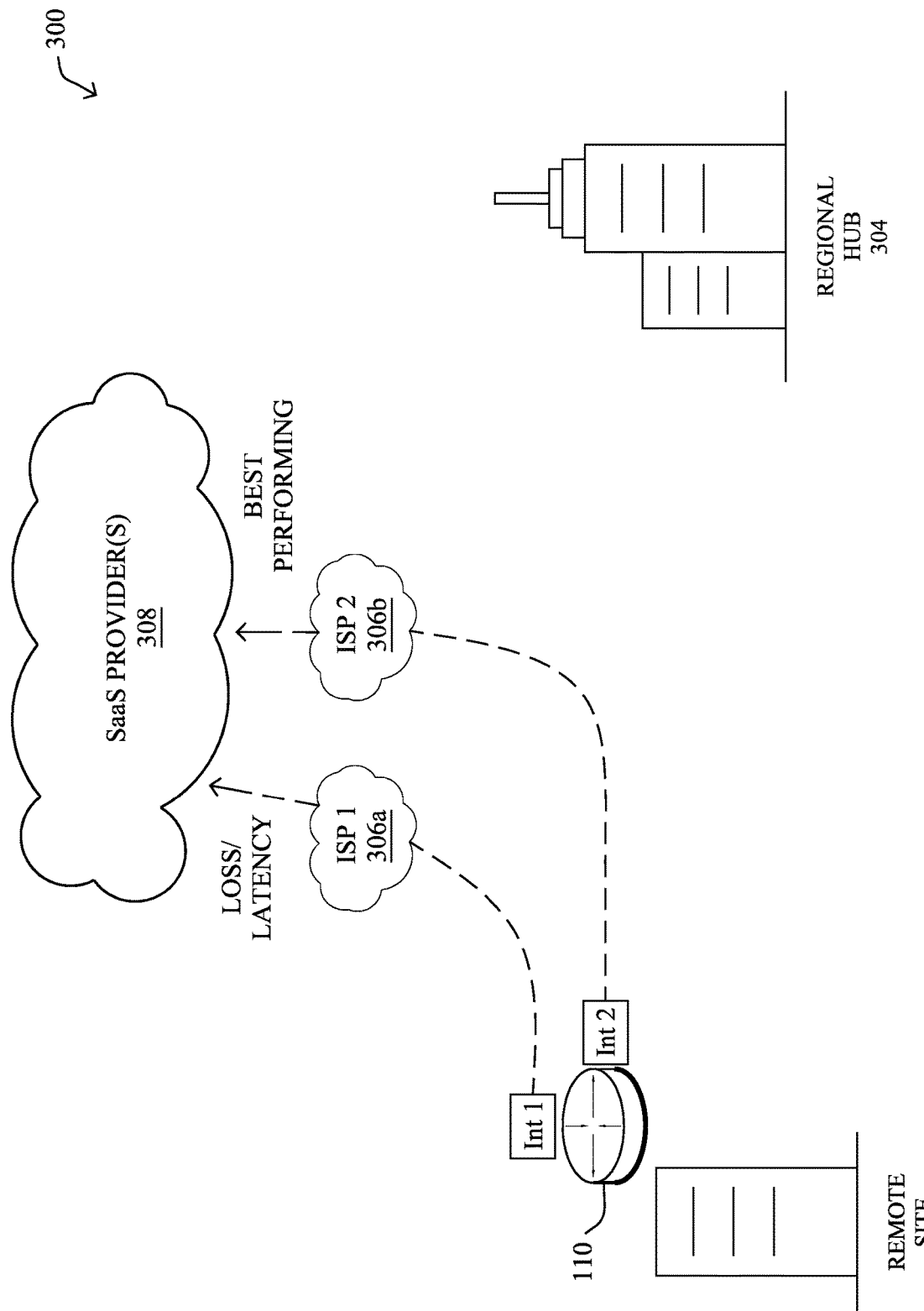
FIGS. 3A-3B illustrate example network deployments.
Figure 3B:
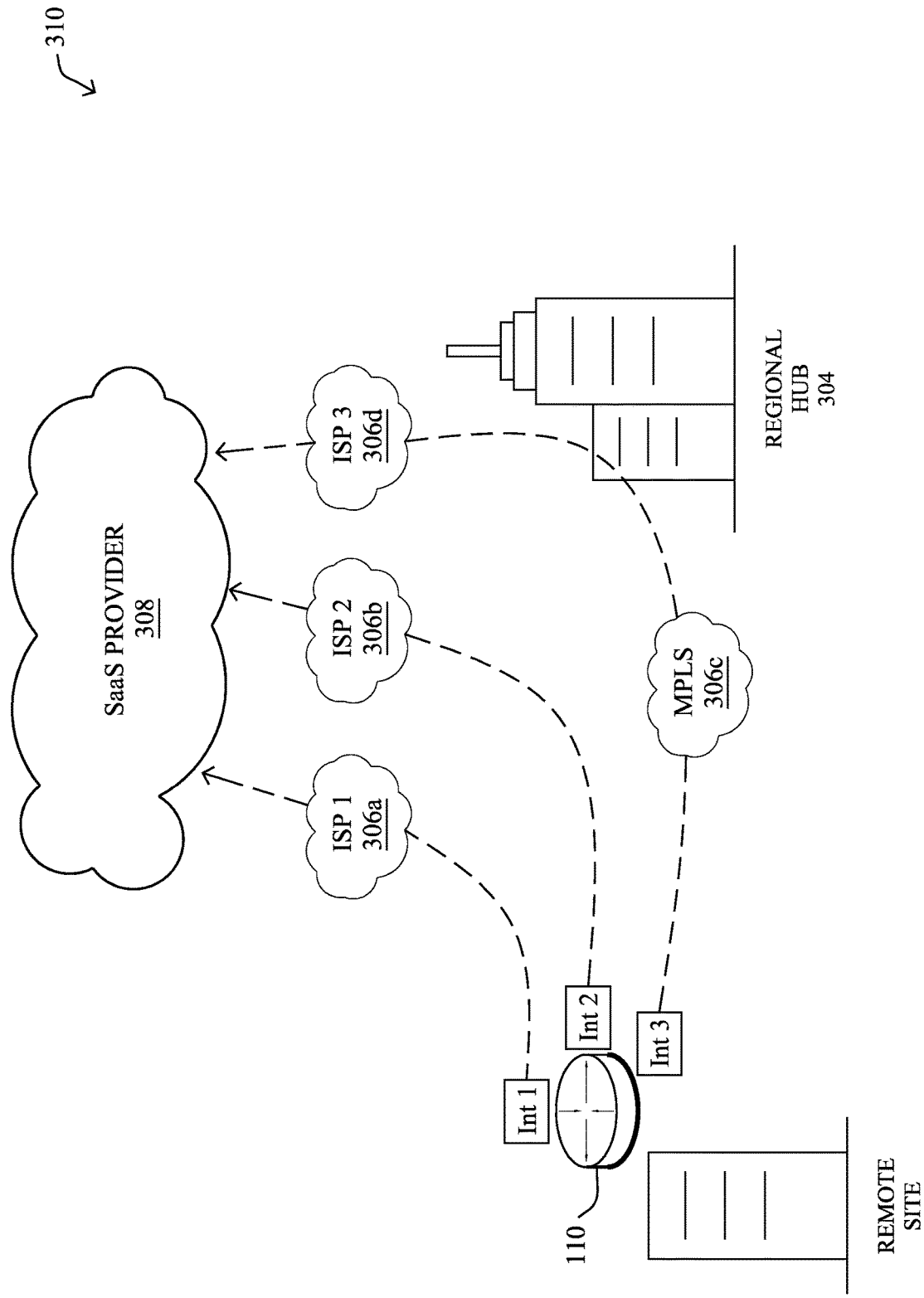

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
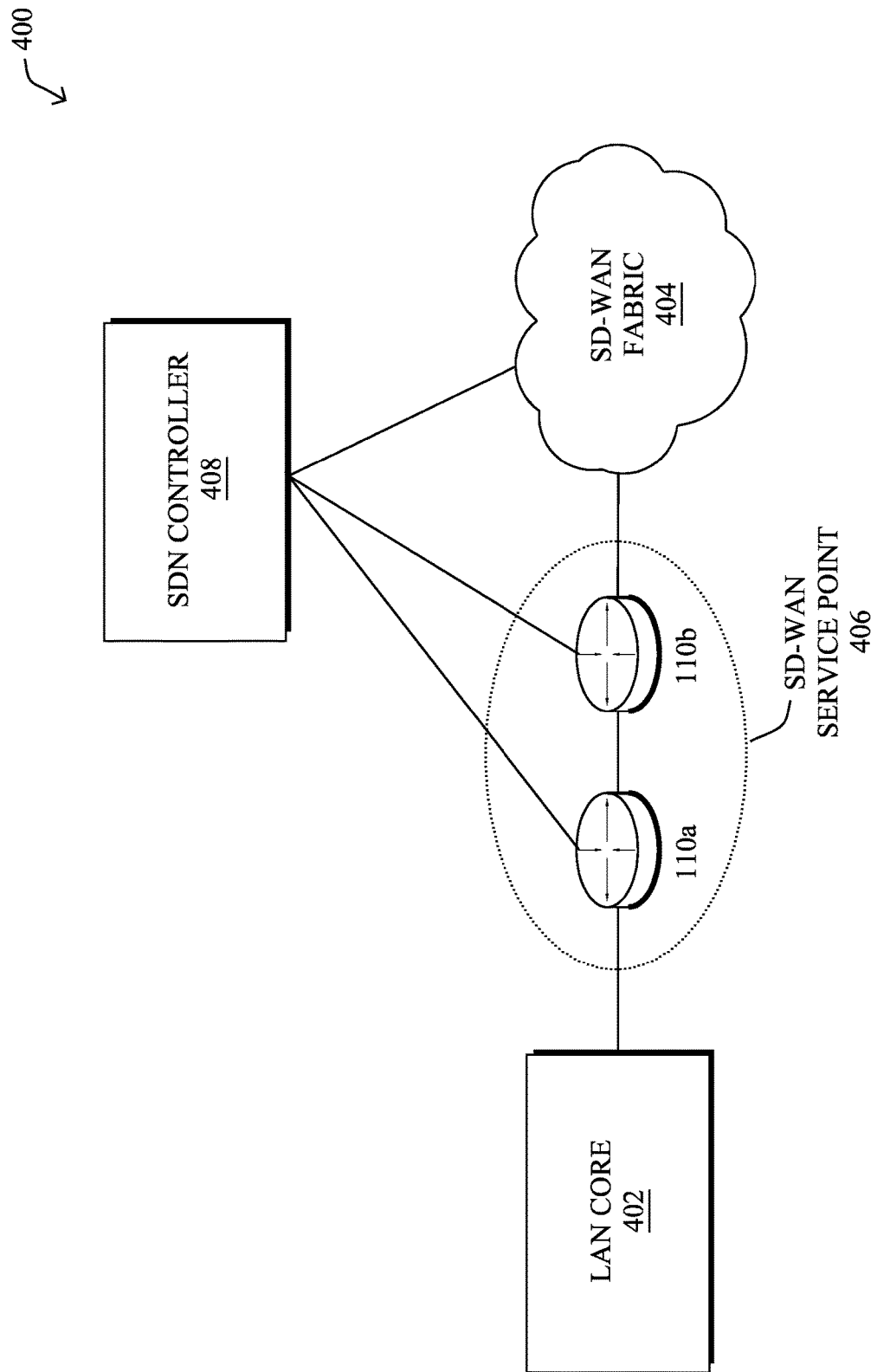
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365. ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS. Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS. LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS. OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
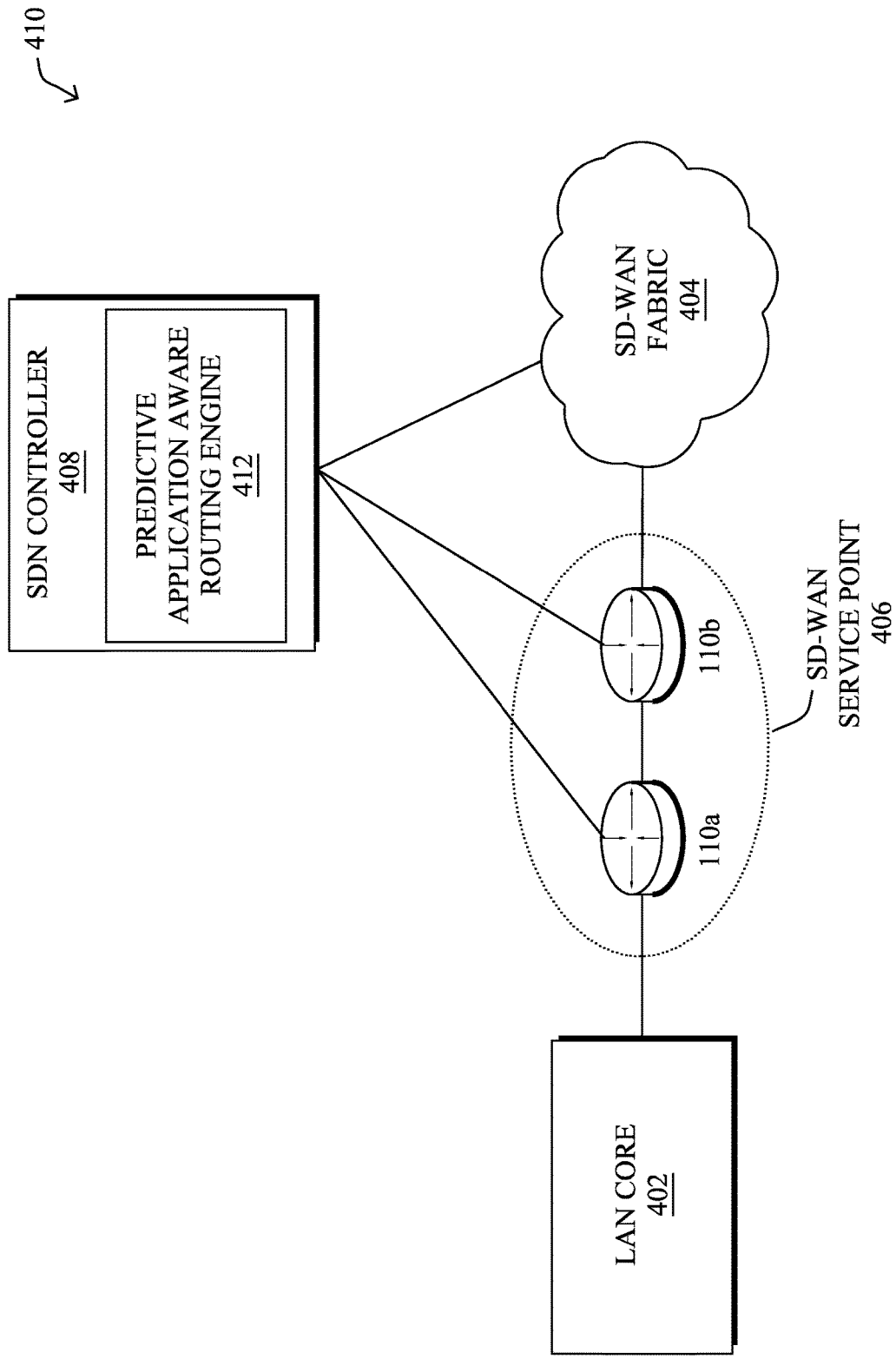

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b. SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application (e.g., via an API, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, network administrators often need to identify paths that do not provide satisfactory user experience, and identify what is wrong, and fix the paths by interacting with other network and/or Service Providers (SPs). Given tens of thousands of paths in the network (e.g., multiple tunnels between branch routers to data-centers, DIA paths from routers to different SaaS applications, etc.), it extremely challenging to determine whether a set of paths has predictable characteristics that 1.) provide bad user experience for an online application and 1.) the characteristics are systemic such that the network administrator can take remediations.

Anomalous paths could result potentially due to the dynamics of the network. For example, all paths from a particular edge router connected to a business Internet link from a particular site may have periodic spikes in loss during work hours, which are deteriorating the application experience. This is a systemic problem, as it involves both the site and its connection with the service provider (SP) of the Internet connection. If identified as the problem, the network operator may report the problem to the SP, so that the problem can be corrected. However, manually identifying such paths and tracking that the paths were finally fixed is extremely challenging and largely infeasible, in many cases.

Automatic Detection and Tracking of Anomalous Rectifiable Paths Using Time-Series Dynamics The techniques introduced herein allow for the automatic detection and tracking of anomalous and experience-degrading paths by computing time-series features that quantify the type of 'bad' behavior using human interpretable categories across multiple paths. In some aspects, the techniques herein use the network KPI to compute a set of characteristic metrics that capture various different underlying dynamics of the KPI time series, which can then be used to categorize the paths into different dynamics categories. In further aspects, clusters of anomalous paths may be presented to a user, allowing the user to annotate and edit such clusters in, to proceed from system identified characteristics towards rectification of the path. Some of these dynamical categories may also be flagged as being anomalous and need-rectification tag, as specified by a user-defined configuration. Paths tagged by a user to be rectified can then be investigated and fixed, such as via interaction with involved SP(s). In further aspects, the techniques herein support this by also providing interpretable insights gathered from the characteristic metrics for further investigation, and guide the mitigation of the underlying problem. Further aspects of the techniques herein also allow for continuous monitoring of the paths, to ensure that a misbehaving path is indeed fixed.

Illustratively, the techniques described herein may be performed by hardware, software, and/or firmware, such as in accordance with KPI dynamics analysis process 249, which may include computer executable instructions executed by the processor 220 (or independent processor of interfaces 210) to perform functions relating to the techniques described herein, such as in conjunction with the operation of predictive routing process 248.

Specifically, according to various embodiments, a device computes time series dynamics for a performance metric of a path in a network used to convey traffic for an online application. The device matches those time series dynamics to one or more dynamics categories. The device makes a determination as to whether the path in the network is anomalous, based on the one or more dynamics categories. The device provides, based on the determination, an indication that the path in the network is anomalous for display.

Operationally, in various embodiments, to assist a user with tagging anomalous network paths (e.g., tunnels, etc.), a statistical approach is proposed whereby statistical analysis of the network KPIs is performed, to extract a set of characteristic metrics that represent the dynamics of the KPI time series. Based on the extracted characteristic metrics, and with further application of a rule-based heuristic, the paths are then categorized into different dynamics categories. These dynamic categories are based on the nature of the temporal evolution of the network KPIs of interest, such as jitter, loss, latency, actual user experience metrics, observed or predicted SLA violations (e.g., proxy metrics for the application experience), or the like. Furthermore, as described in greater detail below, these dynamic categories may also be grouped into categories such as: normative (acceptable behavior e.g., the loss, jitter remaining below a threshold most of the time), anomalous (behavior pointing to some underlying problem e.g. repetitive high values of loss or jitter over a period of time), or others/uncategorized. From this, the user may be presented with a list of paths which are potentially anomalous with the dynamic category. Traditionally, path-related static characteristics are used to identify the optimal path (e.g., the path with the lowest loss percentage, etc.). However, using the dynamics of the network KPIs, which contribute to the real time experience, it is now possible to ascertain anomalous paths with greater effectiveness.

Figure 5:
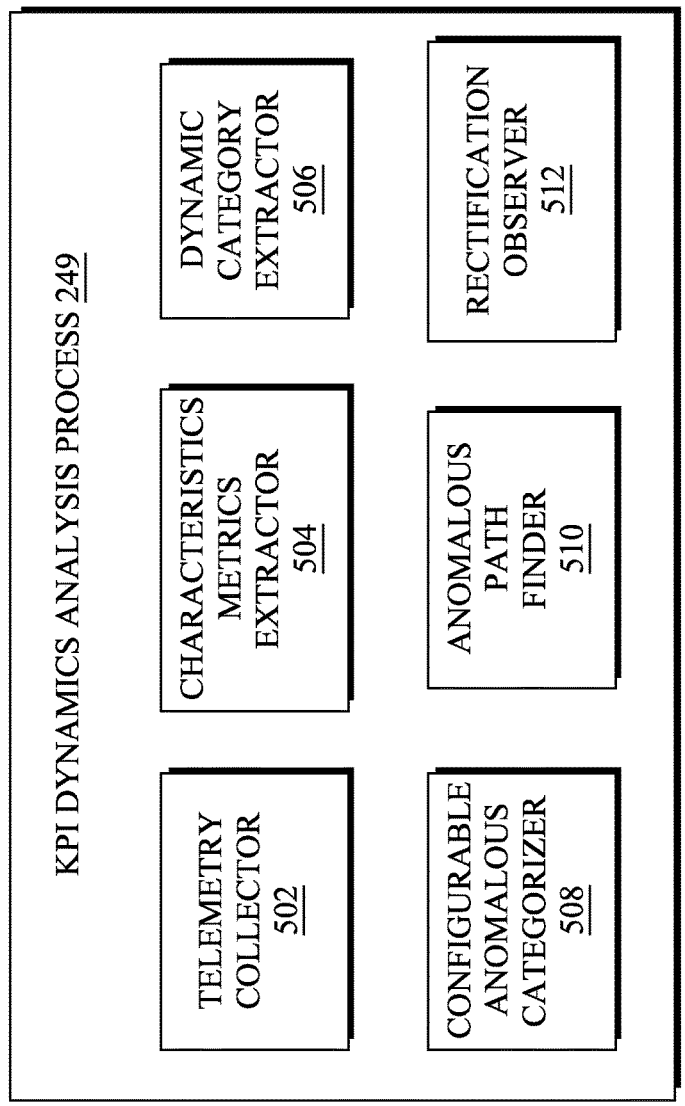
FIG. 5 illustrates an example architecture for detecting and rectifying anomalous paths using time-series features.

FIG. 5 illustrates an example architecture 500 for detecting and rectifying anomalous paths using time-series features, according to various embodiments. At the core of architecture 500 is KPI dynamics analysis process 249, which may be executed by a controller for a network or another device in communication therewith. For instance, KPI dynamics analysis process 249 may be executed by a controller for a network (e.g., SDN controller 408 in FIGS. 4A-4B), a particular networking device in the network (e.g., a router, etc.), another device or service in communication therewith, or the like. In some embodiments, for instance, KPI dynamics analysis process 249 may be used to implement a predictive application aware routing engine, such as predictive application aware routing engine 412, or another supervisory service for the network.

As shown, KPI dynamics analysis process 249 may include any or all of the following components: a telemetry collector 502, a characteristics metrics extractor 504, a dynamic category extractor 506, a configurable anomalous categorizer 508, an anomalous path finder 510, and/or a rectification observer 512. As would be appreciated, the functionalities of these components may be combined or omitted, as desired (e.g., implemented as part of predictive routing process 248). In addition, these components may be implemented on a singular device or in a distributed manner, in which case the combination of executing devices can be viewed as their own singular device for purposes of executing KPI dynamics analysis process 249.

Certain aspects of the operation of KPI dynamics analysis process 249 relate to the computation of new forms of path dynamics metrics. In contrast with existing techniques where path characteristics are limited to gathering telemetry related to the usual network KPI (e.g., latency, loss and jitter) and their value related to hard thresholds, the objective here is to compute metrics that characterize the dynamics of a path and their relation to observed application QoE.

To that end, telemetry collector 502 may collect path telemetry data for a path regarding measured KPIs such as loss, latency, jitter, etc., at a given frequency Fi for a period of time Ti along each path of interest Pi. This can be done either on a pull basis by sending a request to one or more networking devices for the telemetry data or on a push basis, where the telemetry data is sent to telemetry collector 502, automatically. In one embodiment, telemetry could be gathered by telemetry collector 502 using time based telemetry (streaming). In another embodiment, a (more exhaustive) data gathering campaign may be triggered by telemetry collector 502 to gather a rich set of telemetry variables to a collection of routers in the network.

In yet another embodiment, the techniques herein may be limited to a specific set of paths (paths carrying a given set of (critical) applications, a high volume of traffic, etc.), as configured by a user. In addition, another function of telemetry collector 502 may be to compute time series from the received KPI metrics for the various network paths.

In various embodiments, characteristics metrics extractor 504 may compute time series dynamics using the path KPI metrics obtained by telemetry collector 502. More specifically, characteristics metrics extractor 504 may extract a set of characteristic metrics from the time series of KPI metrics, which represent the dynamics of those time series. These metrics capture various salient characteristics of the time series, such as their periodicity, predictability, linear-autoregressivity, etc.) over a time span of the network KPIs from telemetry collector 502.

According to various embodiments, some of the key time series dynamics that characteristics metrics extractor 504 may compute are as follows:

1.) Spectral Entropy (Signifying the Extent of Variability of a Metric):

$$H = -\sum_{i=1}^{N} p_i \cdot \log p_i \cdot x_{p_i} > 0$$

where H is the spectral entropy, pi is the power spectral density of a frequency component i. This metric computes the uncertainty of the binned distribution, constructed from the network KPI time series. In addition, the higher the value of this metric, the higher the degree of uncertainty.

2.) Approximate Entropy (Denotes the Predictability of a Metric):

$$E = \phi^m(r) - \phi^{m+1}(r), \phi^m(r) \propto \sum_{i=1}^{N-m+1} \log(C_i^m(r))$$

Here, the time series is broken down into segments of "m" steps (sliding window). Each segment is indexed by r. For example, for a time series y=[t0, t1, ..., tn], r=1 implies the segment of a time series [t0, t1, ..., tm−1] and r=2 is the segment [t1, t2, ..., tm]. This metric tries to compute the extent of predictability whereby the higher the value of this metric, the lower the predictability of the time series.

3.) Normalized cid_ce

This estimates the complexity of a time series by measuring how many peaks and valleys they have. Hence, is useful to quantify predictability of a signal. This metric may be computed as the normalized squared difference between successive values of the KPI time series:

$$\sqrt{\sum_{i=1}^{n-1}(x_i - x_{i-1})^2}$$

4.) Mean Abs Sum of Changes (MACOS) (Predictability):

This estimates the average differences (absolute) between successive elements of a time series, thus giving an estimate of how much time series changes at each step:

$$MACOS = \frac{\sum_{i=1}^{N-1}|x_{i+1} - x_i|}{N}$$

5.) Linear Trend:

This estimate computes the statistical significance of a time series having a linear trend, where the stronger the trend, the better will be the predictability. The metrics p-value, slope, intercept are computed from the regression below:

$$\sum_{i=1}^{N}(x_i - \alpha \cdot t_i - \beta)^2$$

If the p-value is less than 0.05 (or a suitable alpha) level, it can be inferred with confidence that the coefficient corresponding to the temporal trend is non-zero (which means the time series has a linear temporal trend).

6.) Linear "Auto-Regressiveness":

$$X_t = \varphi_0 + \sum_{i=1}^{k}\varphi_i \cdot X_{t-i} + \epsilon_t$$

This metric computes the coefficients of an auto-regressive process, which is fit with the KPI time series data. This metric tries to estimate how much linear dependence the KPI time series has on the immediate past value, thereby determining how accurately the data generating process be represented by an AR model.

7.) Welch Spectral Density (Periodicity):

Spectral density estimates the strength of the signal at different periods (seasonality periods such as 1 hour, 1 day, etc.). This may be computed using the Fast Fourier Transform (FFT) as shown below:

$$X_k = \sum_{i=0}^{N-1} x_i \cdot e^{-i\frac{2\pi k i}{N}}$$

The FFT is computed on the network metric KPI and the Welch Spectral Density computed from it, representing the periodicity of the time series.

The above embodiments of finding the time series features helps in characterize underlying dynamic behavior of the network KPIs over time, thus helping in the accessing characteristics of different paths. This naturally helps in not only understanding paths, but also choosing the right forecasting mechanism based on the complexity of the time series.

Figure 6A:
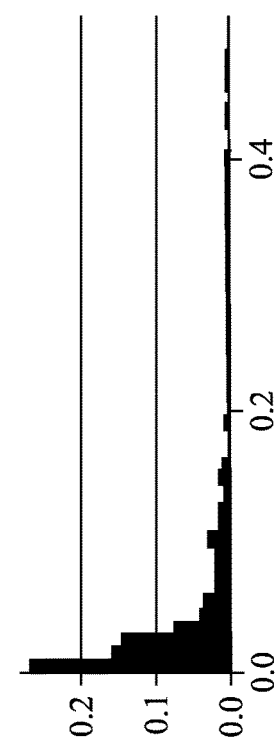
Figure 6B:
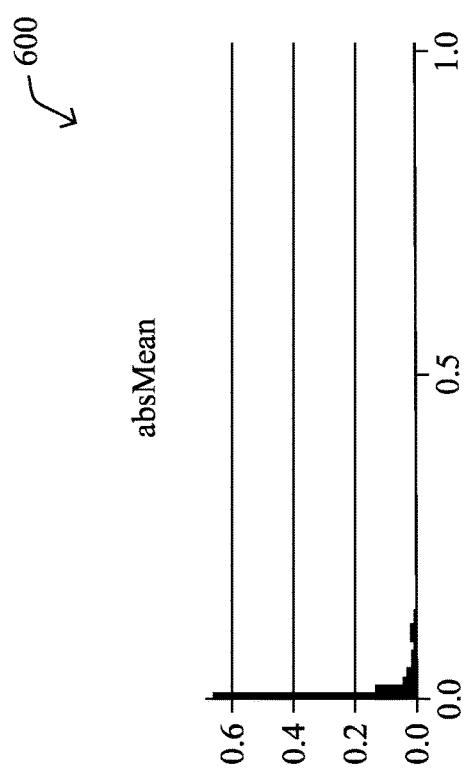
Figure 6C:
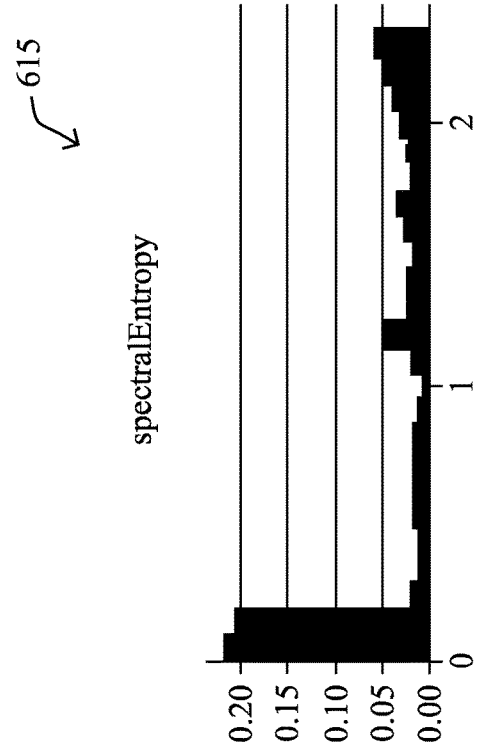
Figure 6D:
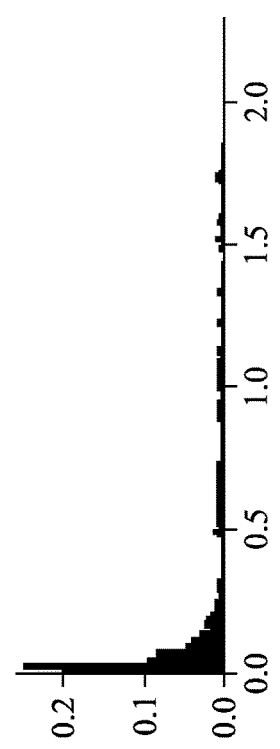
Figure 6I:
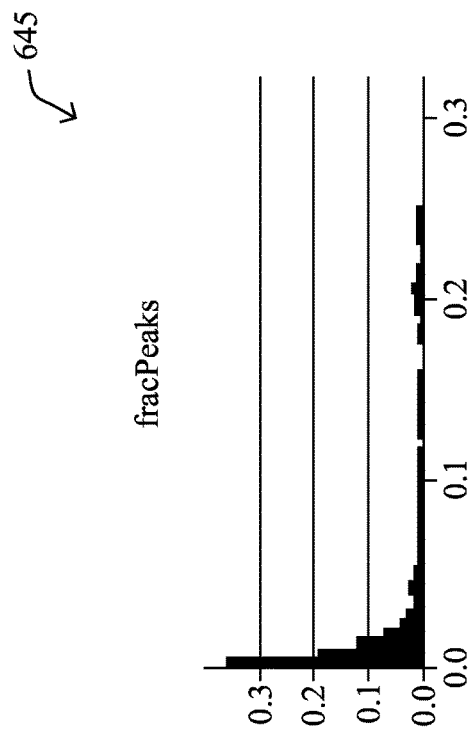
Figure 6J:
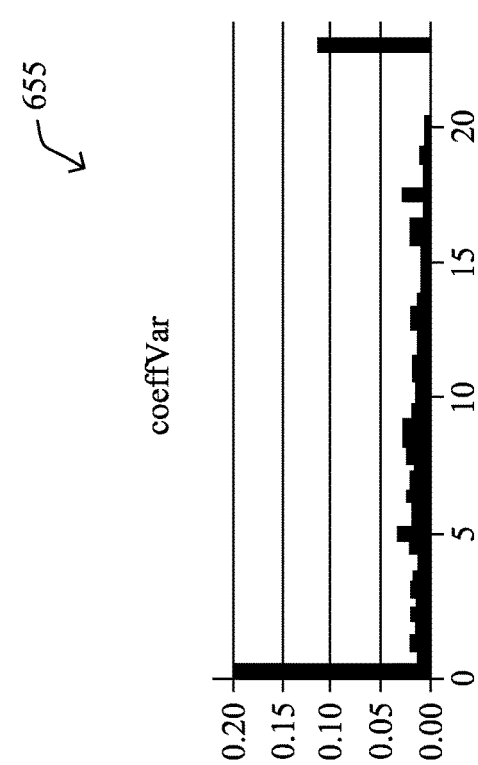
Figure 6K:
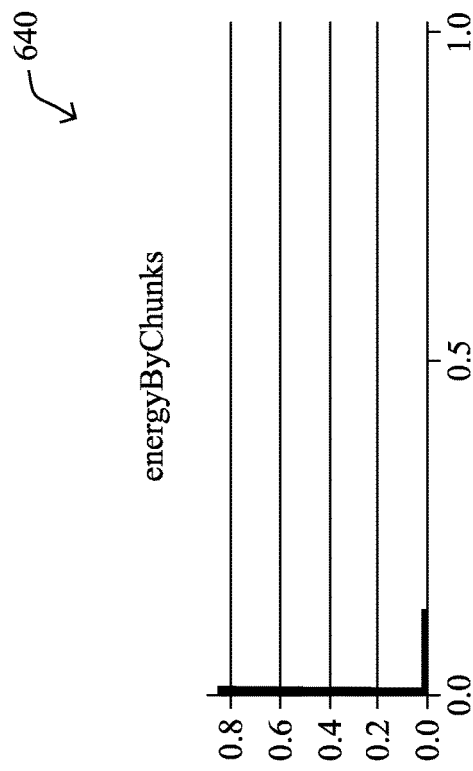
Figure 6L:
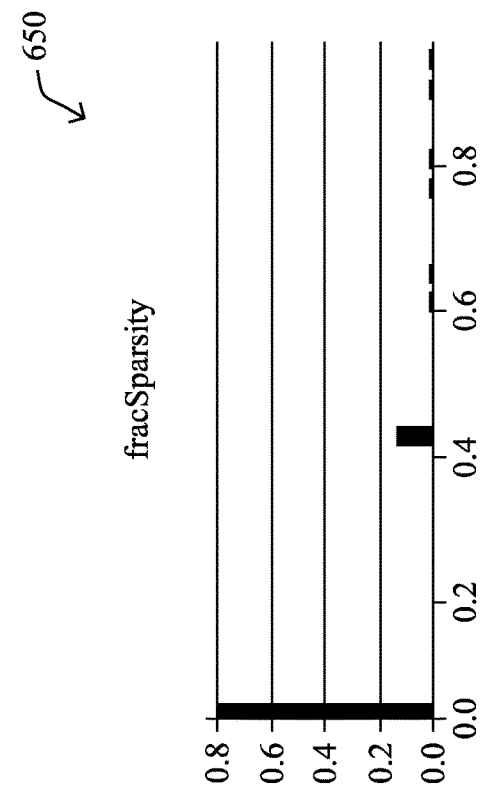

FIGS. 6A-6L illustrate example plots of KPI dynamics, according to various embodiments. More specifically, FIGS. 6A-6I illustrate distributions of different time series characteristic metrics extracted for a set of network KPIs, representing the dynamics of the underlying time series. FIG. 6A shows a plot 600 of the distribution of the absolute mean of the time series (absMean). FIG. 6B shows a plot 605 of the distribution of the standard deviation of the time series (std). FIG. 6C shows a plot 610 of the distribution of the approximate entropy of the time series approxEntropy). FIG. 6D shows a plot 615 of the distribution of the spectral entropy of the time series (spectralEntropy). FIG. 6E shows a plot 620 of the distribution of the Welch spectral density of the time series (spktWelchDensity). FIG. 6F shows a plot 625 of the distribution of the median autoregressive coefficient of the time series (arCoefMedian). FIG. 6G shows a plot 630 of the distribution of the absolute maximum of the autoregressive coefficient of the time series (acfAbsMax). FIG. 6H shows a plot 635 of the distribution of the fraction of the time series above its mean (fracAboveMean). FIG. 6I shows a plot 640 of the distribution of energy by chunks of the time series (energyByChunks). FIG. 6J shows a plot 645 of the distribution of fraction of peaks of the time series (fracPeaks). FIG. 6K shows a plot 650 of the distribution of fraction of sparsity of the time series (fracSparsity). FIG. 6L shows a plot 655 of the distribution of vector autoregression coefficient of the time series (coeffVar).

As would be appreciated, the nature of the distributions helps to discover/represent the underlying dynamics of the time series for the KPI. For example, the heavy-tailed distribution of the spectral entropy in plot 615 in FIG. 6D indicates the presence of noisy KPIs. Similarly, the long-tail of the Welch density in plot 620 in FIG. 6E indicates the presence of periodic behavior by the KPI.

KPI dynamics analysis process 249 may also include dynamic category extractor 506, which identifies the categories of the underlying time series dynamics, according to various embodiments. In various embodiments, these dynamics categories may include any or all of the following:

Normative Dynamical Category (desired behavior):
  Linear-AR-flat (autoregressive flat):
    Zero valued KPI with very few changes.
Anomalous Dynamical Category (pointing to underlying problem):
  Periodic-simple:
    a set of train of pulses, occurring regularly.
  Periodic-nonlinear:
    having other non-periodic region or mixed harmonics.

Other Dynamical Category (may or may not be due to some underlying problem):
  Linear-AR-non-flat (autoregressive non-flat):
    Auto-regressive relatively smooth behavior.
Aperiodic-peaked (non-repetitive peaks):
  Peaks appearing without periodic pattern.
Unknown Category:
  The dynamical behavior which could not be ascertained with certainty from the characteristics metrics.

Figure 7A:
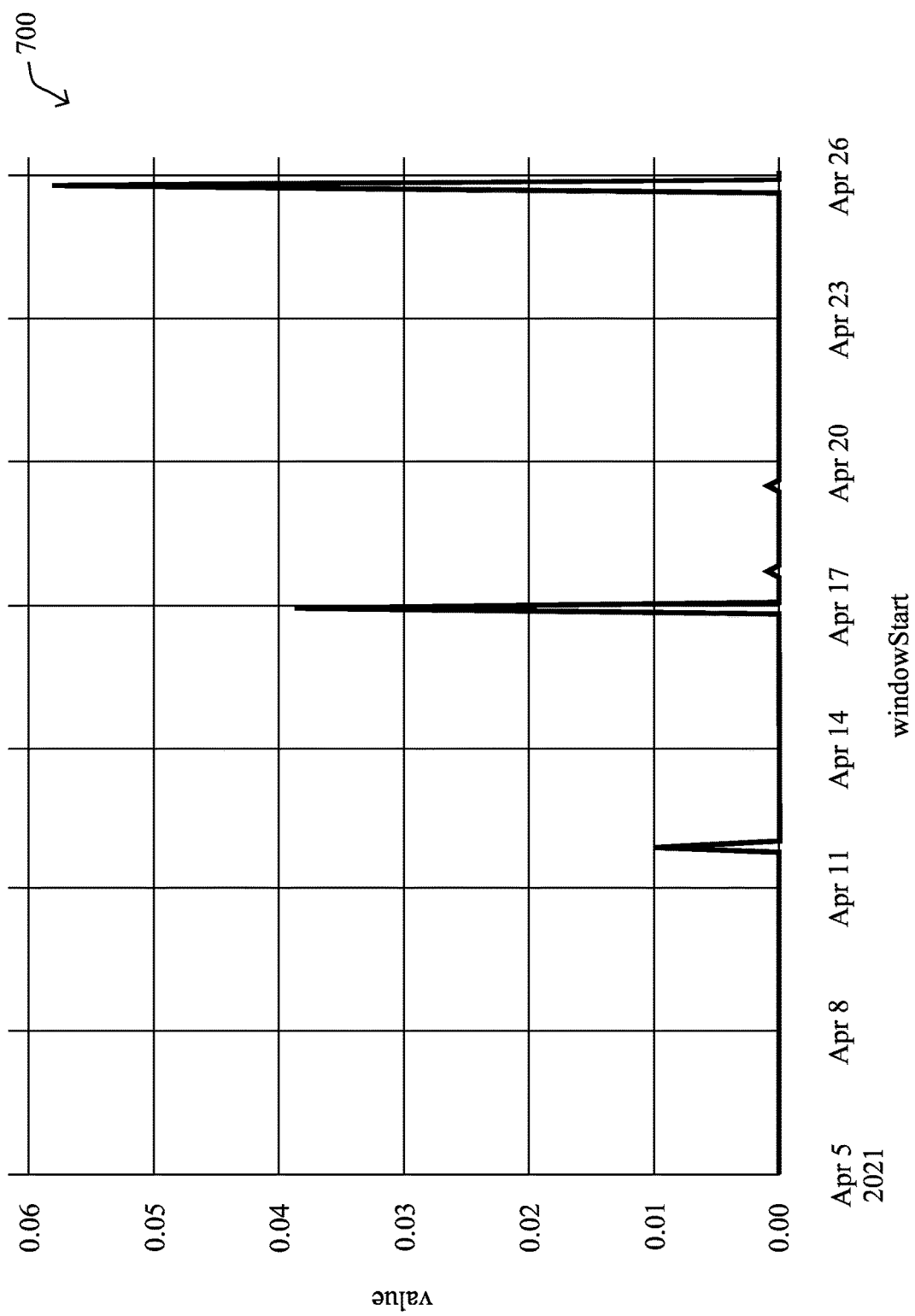
FIGS. 7A-7C illustrate example plots showing different categories of time series dynamics.
Figure 7B:
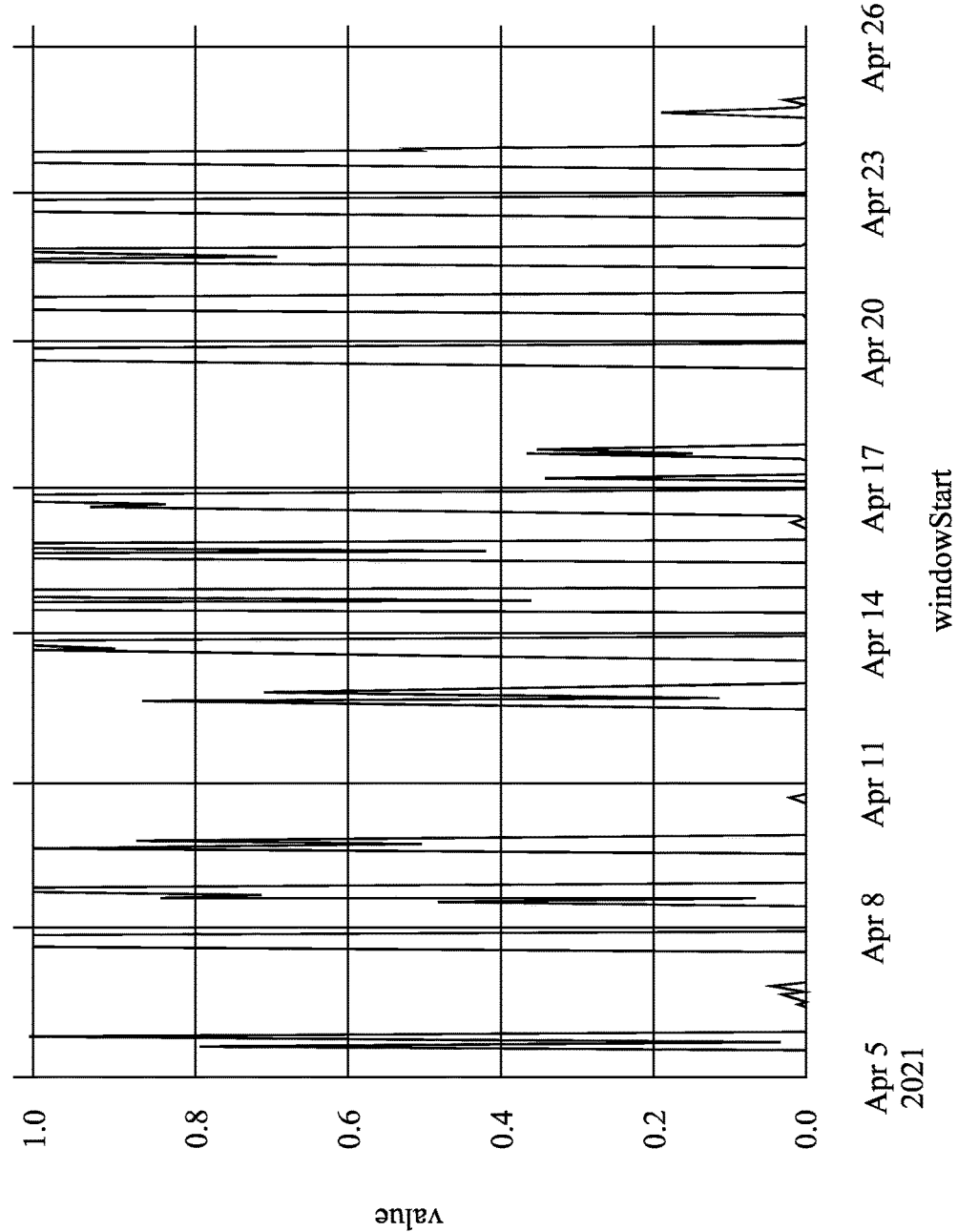
Figure 7C:
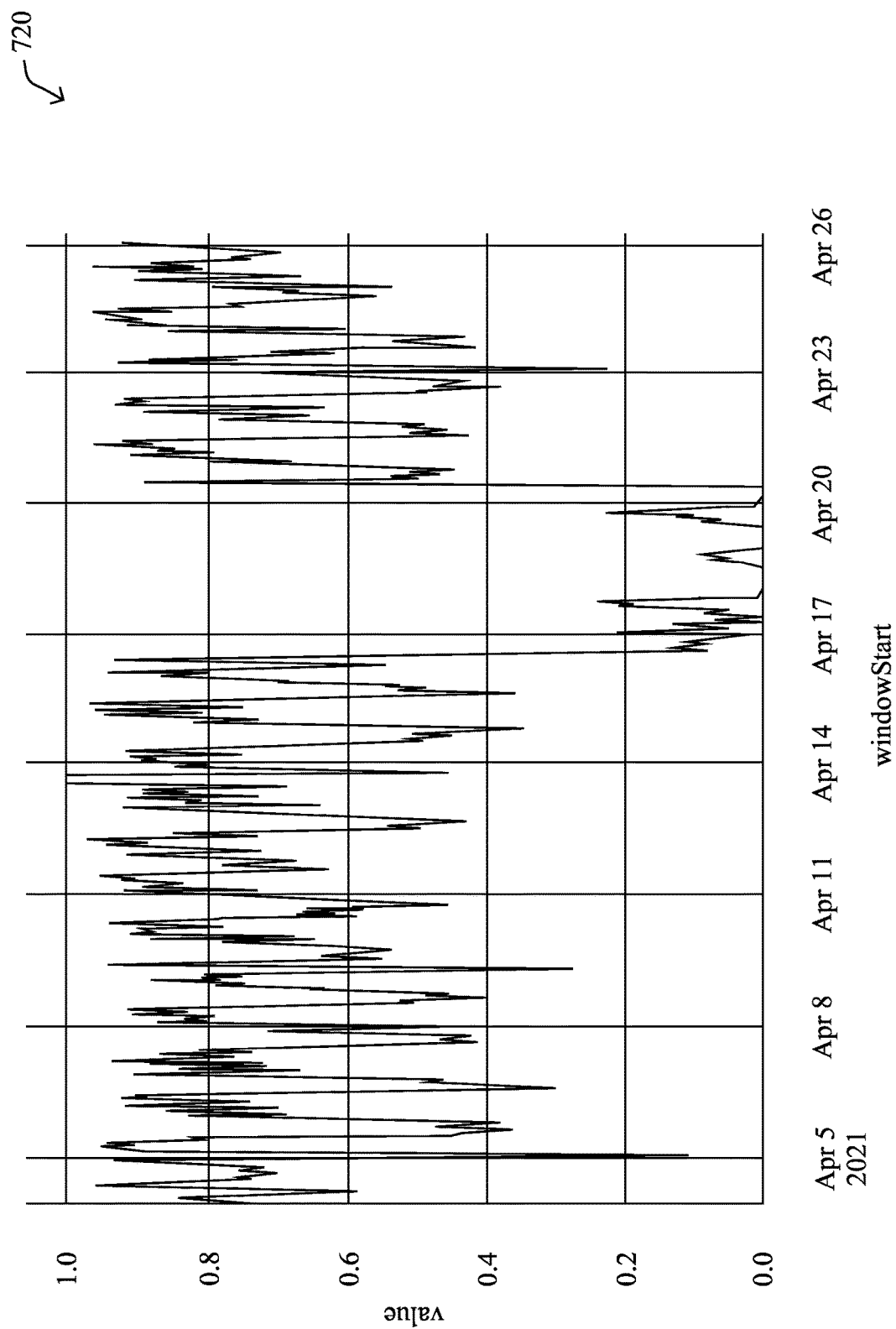

FIGS. 7A-7C illustrate example plots showing different categories of time series dynamics, according to various embodiments. More specifically, FIG. 7A illustrates a plot 700 showing a linear autoregressive flat (normative) dynamics category. FIG. 7B illustrates a plot 710 showing a periodic simple (anomalous) dynamics category. FIG. 7C illustrates a plot 720 showing a periodic non-linear (anomalous) dynamics category. From this, it can be seen that the categories of time series dynamics behaviors can be used to group network paths by these categories and may present in varying degrees in the paths of interest.

Referring again to FIG. 5, KPI dynamics analysis process 249 may also include configurable anomalous categorizer 508, in various embodiments. During operation, configurable anomalous categorizer 508 uses the dynamics categories matched by dynamic category extractor 506 to the time series dynamics from characteristics metrics extractor 504, to determine whether any given path is anomalous or normative/non-anomalous. In some embodiments, configurable anomalous categorizer 508 may receive, via a user interface, an indication from a user as to the sets of dynamics categories that are potentially anomalous. Based on the configuration provided by the user, the paths with anomalous dynamics categories may be flagged automatically by configurable anomalous categorizer 508 at some regular time intervals (e.g., over a period of weeks).

Figure 8:
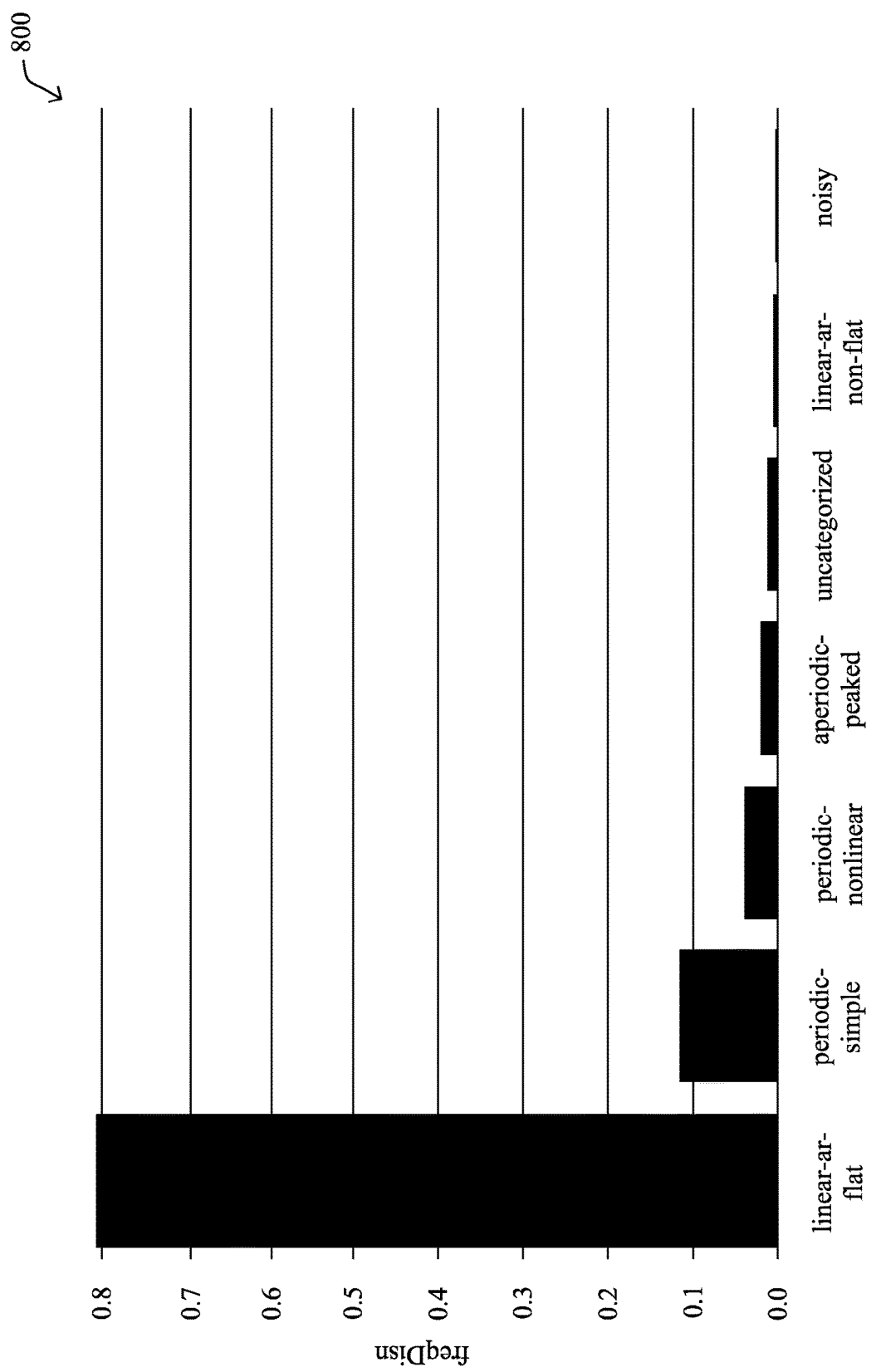
FIG. 8 illustrates an example plot of distributions of different dynamics categories.

By way of example, FIG. 8 illustrates an example plot 800 of distributions of different dynamics categories, in some embodiments. Here, it can be seen that 80% of the paths in the dataset under consideration are linear-AR-flat (normative), while 20% of them can potentially be anomalous (either periodic-simple, periodic-nonlinear, etc.).

When configurable anomalous categorizer 508 determines that a particular path may be anomalous, it may provide an indication of this for display to a user. Such an indication may, for instance, also indicate the dynamics category, the performance metric/KPI of the time series, path information (e.g., the source and/or destination, any service provider associated with the path, etc.), and/or other information that may be of interest to the user.

Figure 9:
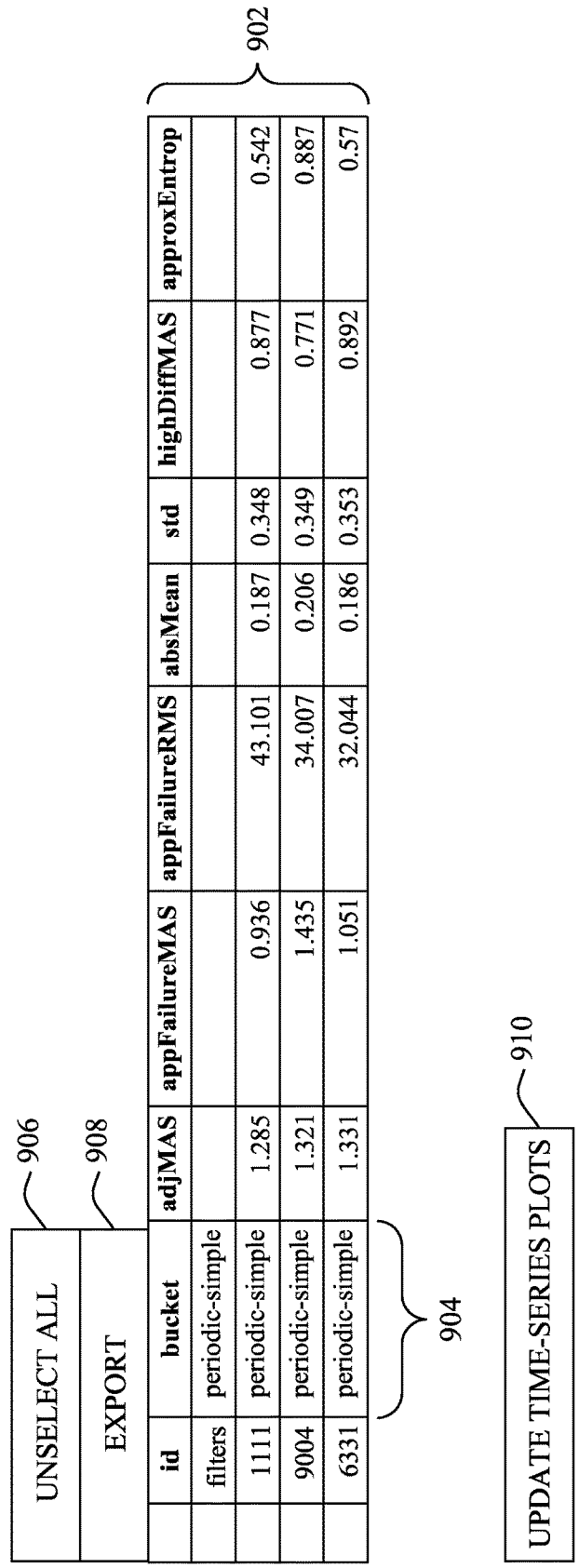
FIG. 9 illustrates an example user interface showing time-series dynamics for network paths.

For instance, FIG. 9 illustrates an example user interface 900 showing time-series dynamics for network paths, according to various embodiments. As shown, user interface 900 may display a table 902 (or other form of indicia) showing the dynamics categories 904 for different paths in the network that have been deemed anomalous. In addition, table 902 may also include other metric, such as the mean, standard deviation, etc., for each of them.

More generally, user interface 900 may show different attributes of the path (such as color, site, IP address of head and tail, etc.) along with its time-series features. The user may activate multiple paths and see the cluster of time-series and tag such a cluster as "work-hours periodic violation at site X." The user may add remove paths from such a cluster, or even split the cluster into multiple human interpretable tags.

In yet another embodiment, configurable anomalous categorizer 508 may correlate, for each category, the service provider breakouts. This allows the user to identify the most paths marked as anomalous (e.g., periodic simple) for a given region, for purposes of root causing the anomalies and instituting fast remediation.

In some instances, user interface 900 may include buttons 906-910 that allow a user to perform functions such as unselecting the selected paths (button 906), export information regarding the selected paths (button 908), update time series plots for the selected paths (button 910), or perform other functions. For instance, selection of button 910 may cause user interface 900 to display the time series of performance metrics/KPIs for the selected paths.

Referring yet again to FIG. 5, KPI dynamics analysis process 249 may also include anomalous path finder 510, which is responsible for reporting anomalous paths and clusters of paths for review. For instance, anomalous path finder 510 may generate a report or notification that can be sent to a particular service provider associated with an anomalous path or cluster of paths. Such a report may also include other human interpretable data, as well, along with potential KPI packet captures.

In some embodiments, anomalous path finder 510 may do so either by providing the visuals of the KPIs for the tagged paths over the period of interest to the user, directly, or by sorting the paths by a pre-defined time series dynamics metric (e.g., Welch's density or approximate entropy), to identify the top N-number of paths and automatically send them to a service provider for review Alongside the path, the dynamics category and few key extracted characteristic metrics could also be provided to the service provider as explanations behind the selected paths being anomalous, as the dynamics categories introduced herein capture the underlying behavior in a natural and explainable way. In turn, a reviewing user may initiate a rectification action and tag the cluster as "investigation initiated," in some embodiments.

KPI dynamics analysis process 249 may further include rectification observer 512, which is responsible for tracking all the manual rectification that is happening (along with user notes). In one embodiment, rectification observer 512 may fetch all paths that are marked as "investigation initiated," and periodically (e.g., every week) re-compute the time series dynamics and their categories (e.g., linear-ar-flat). Rectification observer 512 may also track the change of time-series dynamcis category with other vital statistics of the path (e.g., mean probability of SLA violation, loss, latency and jitter). The ability to detect cluster jump is a form of anomaly detection, especially if a path jumps from a safe (flat) to unsafe (periodic simple) category, thus triggering an alert for the user.

If the path changes to a rectified state, rectification observer 512 may move the state of the path to a "rectified—under observation" state. For example, if a path goes from periodic-simple with high SLA-violation during peaks to linear-ar-flat with near-zero probability of an SLA violation, rectification observer 512 may change its state, as described above. In some instances, rectification observer 512 may wait for a certain period if time (e.g., 7 days), to confirm that the path has indeed been rectified. Once all or a majority of the paths are rectified, rectification observer 512 my then generate a rectification report providing the pre- and post-behaviors of all paths. In addition, rectification observer 512 may also store data regarding the rectification timelines and the associated paths.

If the anomalous behavior of a path is not rectified, but the administrator changes the state to "rectified," rectification observer 512 may again compute a report showing why the paths have not been rectified. In addition to above tagging, in other embodiments, the user or the system may tag the path cluster into other states such as "cannot be rectified," "will be replaced by paths from other SP," etc.

In summary, the techniques herein provide a system and methods for identifying and reporting such anomalous paths, and then aiding the administrators to track until problem resolution. In some aspects, the techniques herein propose mechanisms to automatically cluster paths with different type of problems and patterns using different time-series feature extraction and clustering algorithms (e.g., paths with noisy loss spikes or periodic SLA violation). These clusters can then be presented to an administrator who identifies, refines, and tags the clusters to a specific problem. The system also provides, via a user interface, reports, proof, and explanations of the problems for the cluster of problematic paths identified. The administrator can the tag use these reports for further investigation (e.g., by interacting with the service provider). While being investigated, the system may also automatically track the behavior of paths. Upon conformation of resolution by manual entry (e.g., after the service provider informs that the problem is fixed), the system may also continue to automatically track whether the problem was, indeed, resolved. If not, it reports the pre- and post-resolution reports to the user for review.

Figure 10:
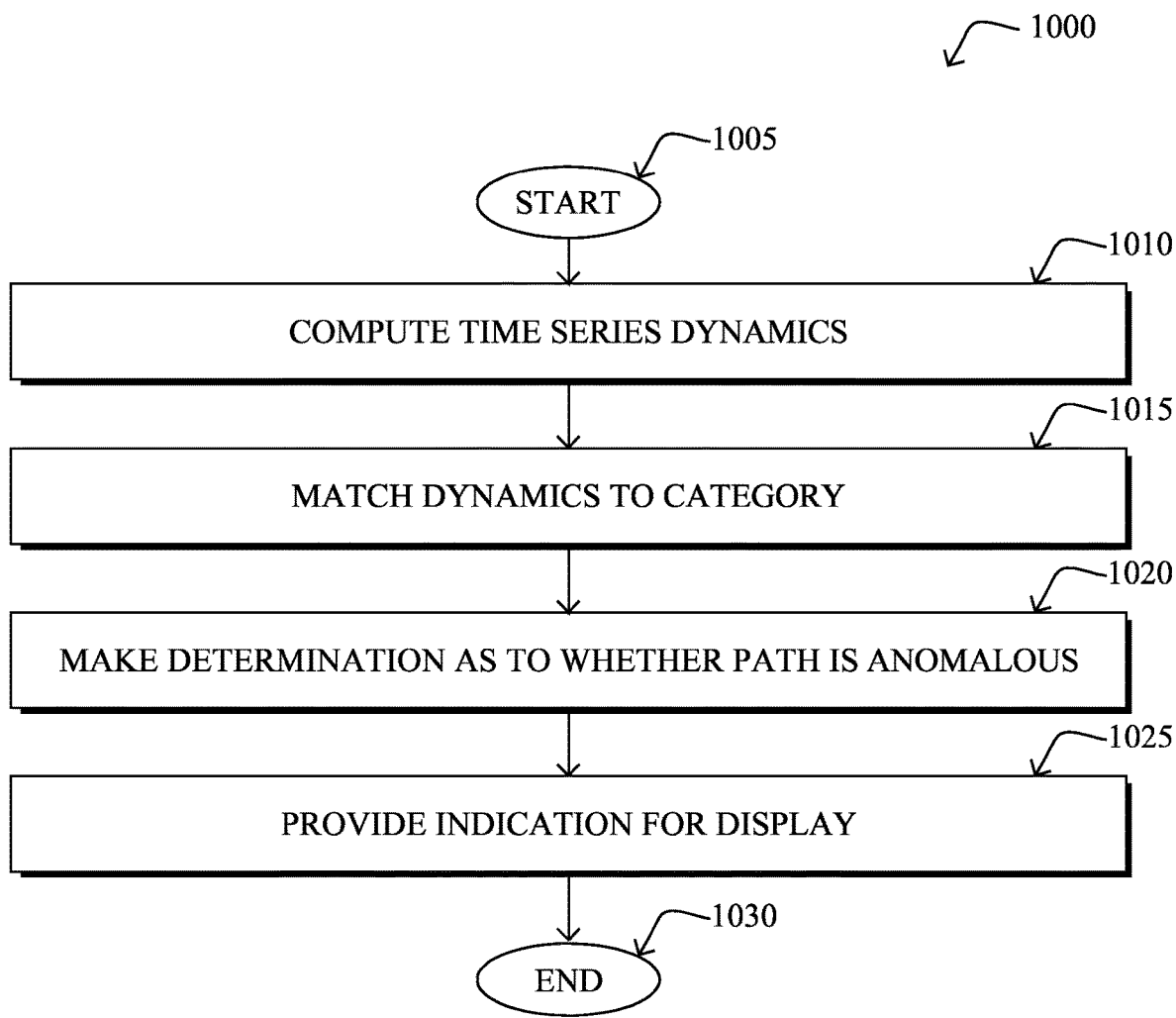
FIG. 10 illustrates an example simplified procedure for the automatic detection and tracking of anomalous rectifiable paths using time-series dynamics.

FIG. 10 illustrates an example simplified procedure 1000 (e.g., a method) procedure for the automatic detection and tracking of anomalous rectifiable paths using time-series dynamics, in accordance with one or more embodiments described herein. For example, a non-generic, specifically configured device (e.g., device 200), such as controller for a network (e.g., an SDN controller, an edge router, or other device in communication therewith) or other supervisory device, may perform procedure 1000 by executing stored instructions (e.g., KPI dynamics analysis process 249). The procedure 1000 may start at step 1005, and continues to step 1010, where, as described in greater detail above, the device may compute time series dynamics for a performance metric of a path in a network used to convey traffic for an online application. In some embodiments, the performance metric comprises at least one of: packet loss, delay, or jitter along the path in the network. In further embodiments, the performance metric comprises at least one of: predicted service level agreement violations, observed service level agreement violations, or user satisfaction ratings for the online application. In some embodiments, the online application may be an SaaS application.

At step 1015, as detailed above, the device may match those time series dynamics to one or more dynamics categories. In some embodiments, the time series dynamics are based on a measure of complexity, a measure of predictability, a linear trend, or linear auto-regressiveness. In further embodiments, the time series dynamics are based on a spectral entropy, an approximate entropy, or a Welch spectral density. In additional embodiments, the one or more dynamics categories comprise at least one of: a simple periodic category, a non-linear periodic category, or a linear autoregressive flat category.

At step 1020, the device may make a determination as to whether the path in the network is anomalous, based on the one or more dynamics categories, as described in greater detail above. For instance, certain types of dynamic categories may be anomalous, when compared to those of other paths (e.g., the majority of paths are of a linear-ar-flat nature (normative), whereas the path is associated with a periodic-simple or periodic-nonlinear category).

At step 1025, as detailed above, the device may provide, based on the determination, an indication that the path in the network is anomalous for display. In one embodiment, the indication further indicates the one or more dynamics categories. In some embodiments, the device may also confirm whether a rectification action for the path has caused the path to become non-anomalous. In another embodiment, the device may also provide a time series of the performance metric for display. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for the automatic detection and tracking of anomalous rectifiable paths using time-series dynamics, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   computing, by a device, time series dynamics for a performance metric of a path in a network used to convey traffic for an online application;
   matching, by the device, those time series dynamics to one or more dynamics categories that represent one or more categories of temporal evolution of the performance metric over time, wherein the one or more dynamics categories comprise at least one of: a simple periodic category, a non-linear periodic category, or a linear autoregressive flat category;
   making, by the device, a determination as to whether the path in the network is anomalous, based on the one or more dynamics categories for the performance metric having changed to a different one or more dynamics categories;
   providing, by the device and based on the determination, an indication that the path in the network is anomalous for display; and confirming, by the device, whether a rectification action for the path has caused the path to become non-anomalous.

2. The method as in claim 1, wherein the indication further indicates the different one or more dynamics categories.

3. The method as in claim 1, wherein the performance metric comprises at least one of: packet loss, delay, or jitter along the path in the network.

4. The method as in claim 1, wherein the performance metric comprises at least one of: predicted service level agreement violations, observed service level agreement violations, or user satisfaction ratings for the online application.

5. The method as in claim 1, further comprising:
providing, by the device, a time series of the performance metric for display.

6. The method as in claim 1, wherein the time series dynamics are based on a measure of complexity, a measure of predictability, a linear trend, or linear auto-regressiveness.

7. The method as in claim 1, wherein the time series dynamics are based on a spectral entropy, an approximate entropy, or a Welch spectral density.

8. The method as in claim 1, wherein the online application is a software-as-a-service (SaaS) application.

9. An apparatus, comprising:
one or more network interfaces;
a processor coupled to the one or more network interfaces and configured to execute one or more processes; and
a memory configured to store a process that is executable by the processor, the process when executed configured to:
compute time series dynamics for a performance metric of a path in a network used to convey traffic for an online application;
match those time series dynamics to one or more dynamics categories that represent one or more categories of temporal evolution of the performance metric over time, wherein the one or more dynamics categories comprise at least one of: a simple periodic category, a non-linear periodic category, or a linear autoregressive flat category;
make a determination as to whether the path in the network is anomalous, based on the one or more dynamics categories for the performance metric having changed to a different one or more dynamics categories;
provide, based on the determination, an indication that the path in the network is anomalous for display; and
confirm whether a rectification action for the path has caused the path to become non-anomalous.

10. The apparatus as in claim 9, wherein the indication further indicates the different one or more dynamics categories.

11. The apparatus as in claim 9, wherein the performance metric comprises at least one of: packet loss, delay, or jitter along the path in the network.

12. The apparatus as in claim 9, wherein the performance metric comprises at least one of: predicted service level agreement violations, observed service level agreement violations, or user satisfaction ratings for the online application.

13. The apparatus as in claim 9, wherein the process when executed is further configured to:
provide a time series of the performance metric for display.

14. The apparatus as in claim 9, wherein the time series dynamics are based on a measure of complexity, a measure of predictability, a linear trend, or linear auto-regressiveness.

15. The apparatus as in claim 9, wherein the time series dynamics are based on a spectral entropy, an approximate entropy, or a Welch spectral density.

16. A tangible, non-transitory, computer-readable medium storing program instructions that cause a device to execute a process comprising:
computing, by the device, time series dynamics for a performance metric of a path in a network used to convey traffic for an online application;
matching, by the device, those time series dynamics to one or more dynamics categories that represent one or more categories of temporal evolution of the performance metric over time, wherein the one or more dynamics categories comprise at least one of: a simple periodic category, a non-linear periodic category, or a linear autoregressive flat category;
making, by the device, a determination as to whether the path in the network is anomalous, based on the one or more dynamics categories for the performance metric having changed to a different one or more dynamics categories;
providing, by the device and based on the determination, an indication that the path in the network is anomalous for display; and
confirming, by the device, whether a rectification action for the path has caused the path to become non-anomalous.

\* \* \* \* \*